United States Patent
Hotta et al.

(10) Patent No.: US 9,934,378 B1
(45) Date of Patent: Apr. 3, 2018

(54) SYSTEMS AND METHODS FOR FILTERING LOG FILES

(71) Applicant: Symantec Corporation, Mountain View, CA (US)

(72) Inventors: Nobuto Hotta, Torrance, CA (US); Nathan Brogan, Redondo Beach, CA (US); Patrick Coyne, Torrance, CA (US)

(73) Assignee: Symantec Corporation, Mountain View, CA (US)

( * ) Notice: Subject to any disclaimer, the term of this patent is extended or adjusted under 35 U.S.C. 154(b) by 316 days.

(21) Appl. No.: 14/691,601

(22) Filed: Apr. 21, 2015

(51) Int. Cl.
*G06F 11/00* (2006.01)
*G06F 21/56* (2013.01)
*G06F 17/30* (2006.01)

(52) U.S. Cl.
CPC ...... *G06F 21/562* (2013.01); *G06F 17/30867* (2013.01); *G06F 2221/034* (2013.01)

(58) Field of Classification Search
CPC ............. G06F 21/562; G06F 17/30867; G06F 2221/034
See application file for complete search history.

(56) References Cited

U.S. PATENT DOCUMENTS

| | | | | |
|---|---|---|---|---|
| 6,405,318 B1* | 6/2002 | Rowland | ............... | G06F 21/552 726/22 |
| 7,203,962 B1* | 4/2007 | Moran | ..................... | G06F 21/52 726/23 |
| 7,472,420 B1* | 12/2008 | Pavlyushchik | ......... | G06F 21/55 707/999.2 |
| 8,839,435 B1* | 9/2014 | King | ..................... | H04L 63/1425 726/22 |
| 2004/0111632 A1* | 6/2004 | Halperin | ............... | G06F 21/552 726/24 |
| 2007/0283438 A1* | 12/2007 | Fries | .................... | G06F 11/1448 726/24 |
| 2008/0037791 A1* | 2/2008 | Jakobsson | ............. | G06F 21/552 380/278 |
| 2008/0282347 A1* | 11/2008 | Dadhia | ............... | H04L 63/1416 726/22 |
| 2012/0222120 A1* | 8/2012 | Rim | ...................... | G06F 21/566 726/24 |

(Continued)

OTHER PUBLICATIONS

Alex James; Systems and Methods for Troubleshooting Computing Tasks Using Log Files; U.S. Appl. No. 14/519,107, filed Oct. 20, 2014.

(Continued)

*Primary Examiner* — Khoi Le
(74) *Attorney, Agent, or Firm* — FisherBroyles, LLP

(57) ABSTRACT

The disclosed computer-implemented method for filtering log files may include (1) identifying, on the endpoint computing device, log files that recorded events performed by processes executing on the endpoint computing device, (2) prior to sending the log files from the endpoint computing device to a security server for analysis, filtering, based on an analysis of the events recorded by the log files, the log files by excluding log files that recorded non-suspicious events, and (3) forwarding the filtered log files from the endpoint computing device to the security server for analysis. Various other methods, systems, and computer-readable media are also disclosed.

16 Claims, 7 Drawing Sheets

(56) References Cited

U.S. PATENT DOCUMENTS

2014/0283050 A1* 9/2014 Striem Amit ....... H04L 63/1425
726/23
2015/0381637 A1* 12/2015 Raff ................... H04L 63/0218
726/23

OTHER PUBLICATIONS

"McAfee", http://www.mcafee.com/us/, as accessed Feb. 24, 2015, (Feb. 29, 2000).
"Kaspersky", http://usa.kaspersky.com/?domain=kaspersky.com, as accessed Feb. 24, 2015, (Aug. 24, 2012).
"Logfile", http://en.wikipedia.org/wiki/Logfile, as accessed Feb. 24, 2015, Wikipedia, (Aug. 13, 2013).
"Process (computing)", http://en.wikipedia.org/wiki/Process_%28computing%29, as accessed Feb. 24, 2015, (Apr. 23, 2004).

* cited by examiner

Log File
208(1)

Date: 3/29/2015
Time: 11:37:48 AM
Level: Information
Event ID: 6921
Event Details: csrss.exe acted on ccSvcHst.exe block thread create Log File
208(2)

Date: 3/30/2015
Time: 10:52:16 PM
Level: Warning
Event ID: 501
Event Details: csrss.exe acted on Chrome.exe thread create Log File
208(3)

Date: 3/31/2015
Time: 9:07:32 AM
Level: Warning
Event ID: 352
Event Details: cfmon.exe acted on Chrome.exe thread create

*FIG. 4*

SYSTEMS AND METHODS FOR FILTERING LOG FILES

BACKGROUND

Log files may provide valuable information about the performance and/or security of various applications running on computing devices. For example, a log file may record each event or action performed by an application, including events that may indicate the presence and/or cause of a malware infection, access control violation, or performance deficiency. As such, enterprises may deploy logging systems within their computing devices that send all or a portion of the log events generated on the computing devices to a central server. The server may then analyze the log events to identify problems such as security breaches or software malfunctions.

Unfortunately, traditional logging systems may forward vast numbers of unnecessary and/or unhelpful log events to security servers. As a result, servers and/or IT administrators may have to analyze massive numbers of normal, non-suspicious log events to identify small numbers of abnormal or suspicious log events. Some logging technologies may attempt to mitigate this problem by aggregating log files (e.g., grouping log files from related processes or operating systems). However, such techniques may not sufficiently eliminate or reduce the quantity of unnecessary log files sent for analysis. In the event that too many non-suspicious log files are forwarded to a security server, the security server may be unable to effectively identify security threats. As a result, computing devices that forwarded the log files may be vulnerable to malware, data leaks, or any additional attack. Therefore, the current disclosure identifies and addresses a need for additional and improved systems and methods for filtering log files.

SUMMARY

As will be described in greater detail below, the instant disclosure describes various systems and methods for filtering log files by identifying log files that recorded non-suspicious events. The systems and methods described herein may then exclude the log files that recorded non-suspicious events from the log files that are sent to a security server for analysis.

In one example, a computer-implemented method for performing such a task may include (1) identifying, on an endpoint computing device, log files that recorded events performed by processes executing on the endpoint computing device, (2) prior to sending the log files from the endpoint computing device to a security server for analysis, filtering, based on an analysis of the events recorded by the log files, the log files by excluding log files that recorded non-suspicious events, and (3) forwarding the filtered log files from the endpoint computing device to the security server for analysis.

In some embodiments, filtering the log files may involve including, within the filtered log files that are to be forwarded to the security server, log files that recorded events performed by untrusted processes. In these embodiments, including the log files that recorded events performed by untrusted processes may involve determining, by querying a database that stores reputations of files that generate processes, that the recorded events in question were performed by untrusted processes.

In the same or additional embodiments, filtering the log files may involve including, within the filtered log files that are to be forwarded to the security server, events performed by trusted processes that nevertheless fail to satisfy a predetermined trustworthiness threshold. In these embodiments, the method may involve calculating trustworthiness scores for the trusted processes based on a behavioral analysis of the trusted processes. The method may then involve determining that the trustworthiness scores for the trusted processes fail to satisfy the predetermined trustworthiness threshold. Furthermore, the method may involve determining that the trusted processes were potentially compromised by non-process threats.

In some examples, excluding, from the filtered log files that are to be forwarded to the security server, the log files that recorded non-suspicious events may involve excluding log files that recorded events performed by trusted processes. In these examples, excluding the log files that recorded events performed by trusted processes may involve determining, by querying a database that stores reputations of files that generate processes, that the recorded events in question were performed by trusted processes.

In the same or additional examples, excluding the log files that recorded non-suspicious events may involve excluding log files that recorded events performed by processes that satisfy a predetermined trustworthiness threshold. In these examples, the method may involve calculating trustworthiness scores for the processes based on a behavioral analysis of the processes. The method may then involve determining that the trustworthiness scores for the processes satisfy the predetermined trustworthiness threshold.

In some embodiments, the method may further involve receiving, from the security server, an identification of at least one security threat potentially affecting the endpoint computing device that was identified by the security server by analyzing the filtered log files. The method may then involve performing, at the endpoint computing device, at least one security action on the identified security threat.

In one embodiment, a system for implementing the above-described method may include (1) an identification module that identifies, on at least one endpoint computing device, log files that recorded events performed by processes executing on the endpoint computing device, (2) a filter module that, prior to the log files being sent from the endpoint computing device to a security server for analysis, filters, based on an analysis of the events recorded by the log files, the log files by excluding log files that recorded non-suspicious events, and (3) a forward module that forwards the filtered log files from the endpoint computing device to the security server for analysis. In addition, the system may include at least one processor that executes the identification module, the filter module, and the forward module.

In some examples, the above-described method may be encoded as computer-readable instructions on a non-transitory computer-readable medium. For example, a computer-readable medium may include one or more computer-executable instructions that, when executed by at least one processor of at least one endpoint computing device, may cause the endpoint computing device to (1) identify, on the endpoint computing device, log files that recorded events performed by processes executing on the endpoint computing device, (2) prior to sending the log files from the endpoint computing device to a security server for analysis, filter, based on an analysis of the events recorded by the log files, the log files by excluding log files that recorded non-suspicious events, and (3) forward the filtered log files from the endpoint computing device to the security server for analysis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary log files.

Figure 1:
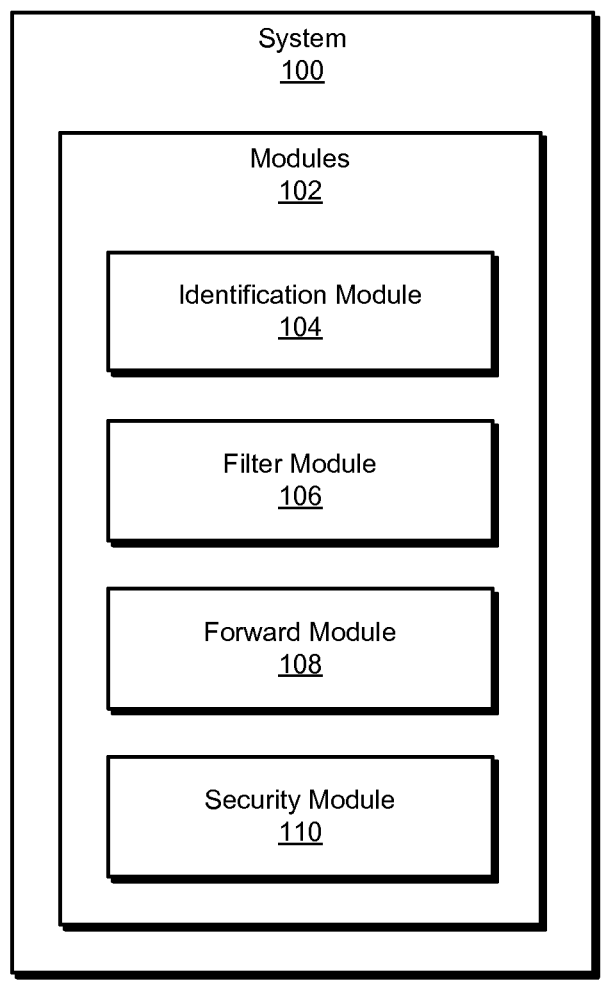
FIG. 1 is a block diagram of an exemplary system for filtering log files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for filtering log files. As will be explained in greater detail below, by identifying and analyzing log files on endpoint computing devices, the systems and methods described herein may filter the log files before forwarding the log files from the endpoint computing devices to a security server for analysis. For example, by analyzing the reputation and/or behaviors of processes that performed events recorded by log files, the disclosed systems and methods may identify log files that recorded suspicious events and log files that recorded non-suspicious events. The systems and methods described herein may then forward only log files that recorded suspicious events (instead of log files that recorded non-suspicious events) to a security server that identifies security threats based on the filtered log files. As such, the disclosed systems and methods may reduce the time, bandwidth, and/or computing resources consumed by a security server that analyzes log files by preventing irrelevant and/or unnecessary log files from being sent to the security server.

Figure 2:
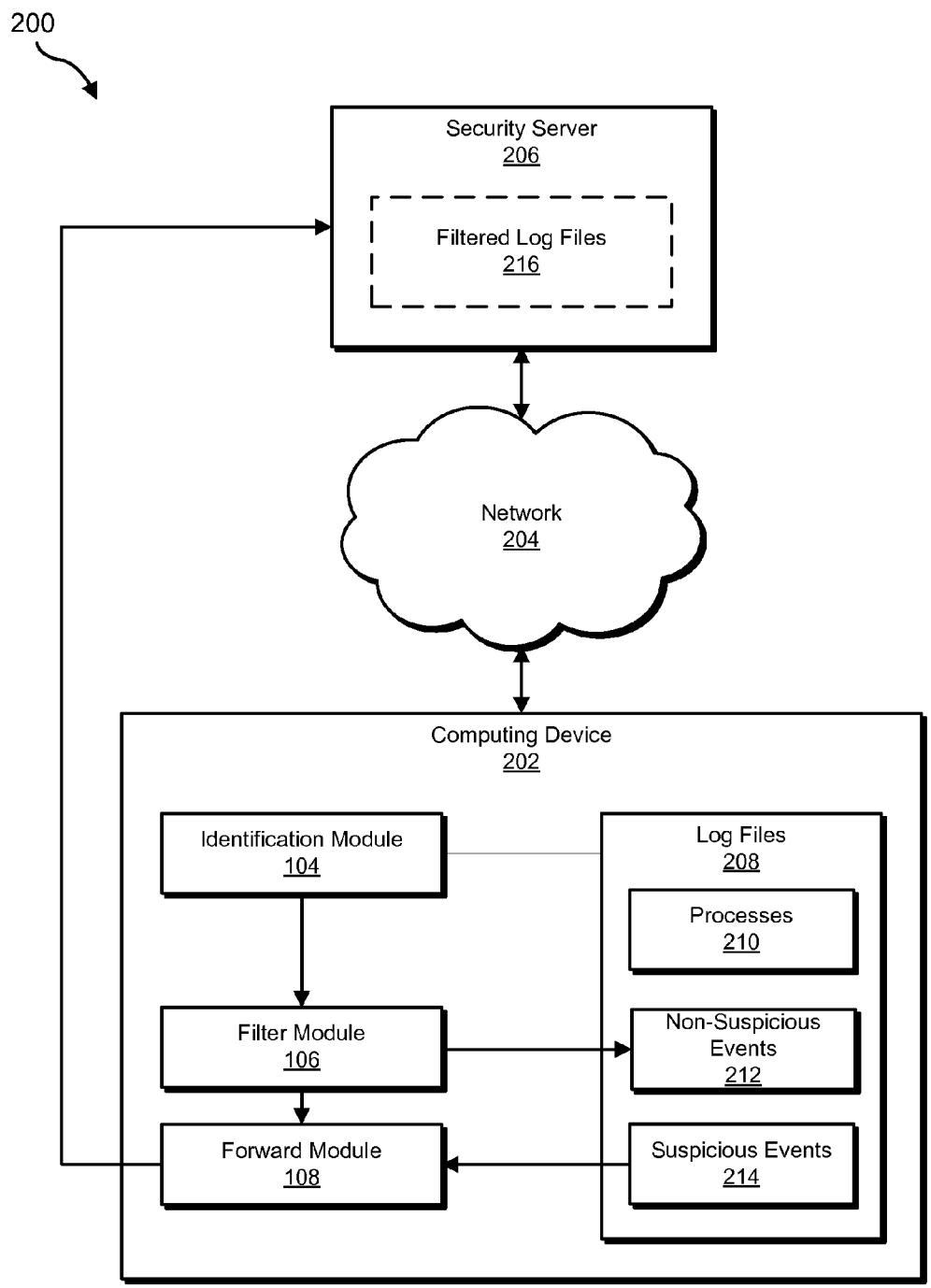
FIG. 2 is a block diagram of an additional exemplary system for filtering log files.

The following will provide, with reference to FIGS. 1 and 2, detailed descriptions of exemplary systems for filtering log files. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for filtering log files. As illustrated in this figure, exemplary system 100 may include one or more modules 102 for performing one or more tasks. For example, and as will be explained in greater detail below, exemplary system 100 may include an identification module 104 that identifies, on an endpoint computing device, log files that recorded events performed by processes executing on the endpoint computing device. Exemplary system 100 may also include a filter module 106 that, prior to the log files being sent from the endpoint computing device to a security server for analysis, filters, based on an analysis of the events recorded by the log files, the log files by excluding log files that recorded non-suspicious events.

In addition, and as will be described in greater detail below, exemplary system 100 may include a forward module 108 that forwards the filtered log files from the endpoint computing device to the security server for analysis. Finally, exemplary system 100 may include a security module 110 that performs security actions at the endpoint computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or security server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a security server 206 via a network 204. In the example of FIG. 2, modules 102 may reside client-side on computing device 202. In this example, modules 102 may identify log files that recorded suspicious and non-suspicious events performed by processes executing on computing device 202. In another example, one or more of modules 102 may reside server-side on security server 206. In this example, modules 102 may operate in the context of a backend security server that receives and analyzes log files that recorded suspicious events performed by processes executing on endpoint computing devices (such as computing device 202).

In one embodiment, one or more of modules 102 from FIG. 1 may, when executed by at least one processor of computing device 202 and/or security server 206, enable computing device 202 and/or security server 206 to filter log files. For example, and as will be described in greater detail below, identification module 104 may cause computing device 202 to identify, on an endpoint computing device (e.g., computing device 202), log files (e.g., log files 208)

that recorded events (e.g., non-suspicious events 212 and/or suspicious events 214) performed by processes (e.g., processes 210) executing on computing device 202. Prior to log files 208 being sent from computing device 202 to a security server (e.g., security server 206) for analysis, filter module 106 may cause computing device 202 to filter, based on an analysis of non-suspicious events 212 and/or suspicious events 214 recorded by log files 208, log files 208 by excluding log files that recorded non-suspicious events 212. Finally, forward module 108 may cause computing device 202 to forward the filtered log files (e.g., filtered log files 216) from computing device 202 to security server 206 for analysis.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing, receiving and/or analyzing log files generated on endpoint computing devices. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
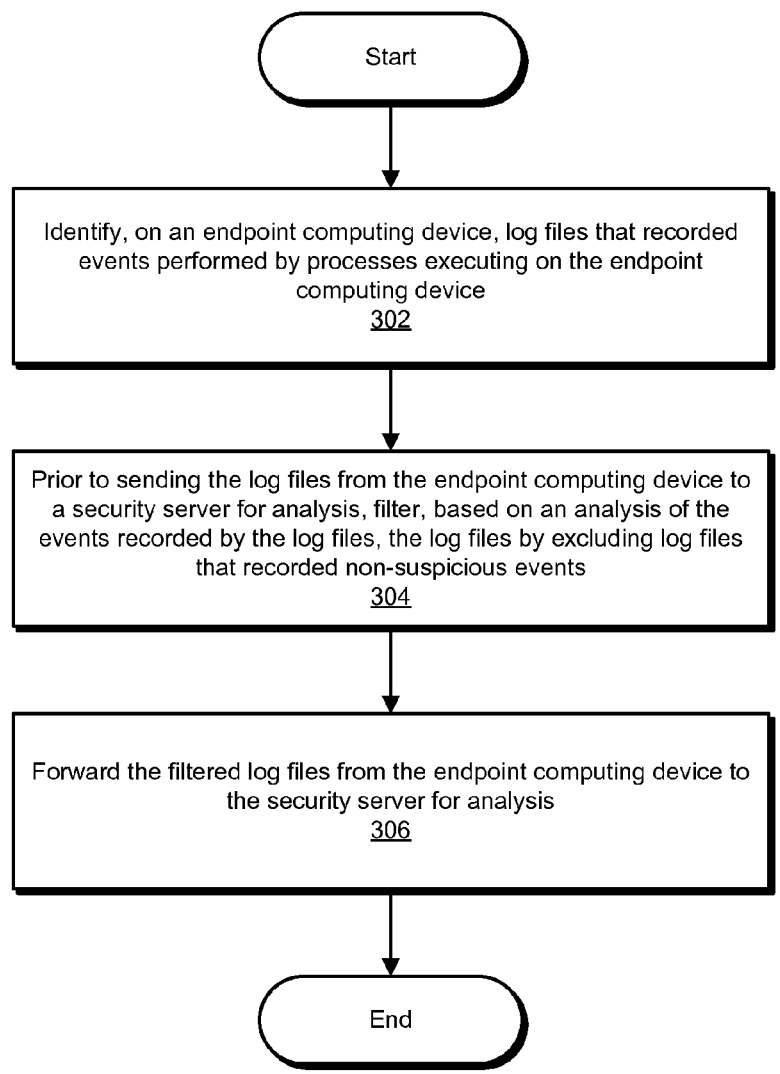
FIG. 3 is a flow diagram of an exemplary method for filtering log files.

FIG. 3 is a flow diagram of an exemplary computer-implemented method 300 for filtering log files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify, on an endpoint computing device, log files that recorded events performed by processes executing on the endpoint computing device. For example, identification module 104 may, as part of computing device 202 in FIG. 2, identify, on computing device 202, log files 208 that recorded events performed by processes 210 executing on computing device 202.

The term "log file," as used herein, generally refers to any type or form of document or data structure that contains information relevant to the execution of one or more computing tasks. In some examples, an operating system may (e.g., automatically or in response to direction from a user) create and/or populate a log file in response to detecting and/or completing each event involved in the process of executing a computing task. For example, a log file may record the creation or termination of a thread, an update or change to a registry or database, the transmission or reception of an electronic message, and/or any additional type of computing event.

In particular, log files may record processes that performed computing events. The term "process," as used herein, generally refers to any instance of an application, program, or file that is currently executing on a computing device. A process may be composed of a single thread or multiple threads. In addition, a process may execute in the foreground or background of a computing device and perform any type or form of job, task, or event.

Moreover, in addition to tracking events that occur during the execution of a computing task, a log file may store information that identifies the computing device performing the events, the time and/or date at which each event was performed, and/or any additional information associated with the events. Furthermore, a log file may record, store, and present data in a variety of formats, including human-readable text and computer code (e.g., binary or hexadecimal sequences).

The systems described herein may identify log files on an endpoint computing device in a variety of ways. In some examples, identification module 104 may monitor one or more logging applications within computing device 202. For example, identification module 104 may track the activity and/or outputs of logging applications that monitor security events, administrative events, application-specific events, and/or any additional type of event.

In some embodiments, identification module 104 may identify each of log files 208 individually as log files 208 are generated by logging applications. In this way, the systems described herein may detect and prevent security threats in real time. Alternatively, identification module 104 may identify and analyze log files 208 in batches. For example, identification module 104 may identify log files generated on computing device 202 after a certain number of log files (e.g., 1000 log files) have been generated. Additionally or alternatively, identification module 104 may analyze log files generated on computing device 202 after a certain period of time (e.g., identification module 104 may identify log files generated on computing device 202 once a day).

Log files 208 may include a variety of information about events performed by processes 210. As an example, FIG. 4 illustrates a portion of log files 208(1-3). As shown in FIG. 4, log file 208(1) may include the date (in this example, "3/29/2015") and time (in this example, "11:37:48 AM") at which a recorded event occurred. Log file 208(1) may also include a level of the recorded event (e.g., a categorization of the type and/or security status of an event). In this example, identification module 104 may determine that the event within log file 208(1) has a level of "information." In addition, log file 208(1) may include an event ID of the recorded event (e.g., a predetermined number that identifies or corresponds to the recorded event). In this example, identification module 104 may identify an event ID of "6921" within log file 208(1). Furthermore, log file 208(1) may include the event details (in this example, "csrss.exe acted on ccSvcHst.exe block thread create") of the recorded event. In this example, the event details within log file 208(1) may indicate that the process "csrss.exe" acted on the program "ccSvcHst.exe" by blocking a thread from being created.

As shown in FIG. 4, log file 208(2) may include similar information. In this example, identification module 104 may determine that the event recorded by log file 208(2) occurred on 3/30/2015 at 10:52:16 AM. Identification module 104 may also determine that the level of the recorded event is "warning" and that the event ID of the recorded event is "501." Furthermore, identification module 104 may determine that the event details of the recorded event are "csrss.exe acted on Chrome.exe thread create." In this example, the event details may indicate that the process "csrss.exe" acted on the program "Chrome.exe" by creating a thread.

Furthermore, identification module 104 may determine that the event recorded by log file 208(3) occurred on 3/31/2015 at 9:07:32 AM. Identification module 104 may also determine that the level of the recorded event is "warning" and that the event ID of the recorded event is "352." In addition, identification module 104 may determine that the event details of the recorded event are "cfmon.exe acted on Chrome.exe thread create." In this example, the event details may indicate that the process "cfmon.exe" acted on the program "Chrome.exe" by creating a thread.

Log files 208 may also include additional information not shown within FIG. 4, such as error messages and/or specific users or computing devices involved in an event. Notably, while each log file within FIG. 4 illustrates a single event, log files 208 may record multiple events involved in completing a computing task.

Returning to FIG. 3, at step 304 one or more of the systems described herein may, prior to sending the log files from the endpoint computing device to a security server for analysis, filter, based on an analysis of the events recorded by the log files, the log files by excluding log files that recorded non-suspicious events. For example, prior to log files 208 being sent from computing device 202 to security server 206 for analysis, filter module 106 may, as part of computing device 202 in FIG. 2, filter, based on an analysis of non-suspicious events 212 and/or suspicious events 214, log files 208 by excluding log files that recorded non-suspicious events 212.

The term "suspicious event," as used herein, generally refers to any type or form of event that indicates an error, malfunction, security threat, access control violation, or other abnormal or undesirable behavior of a process. In one example, a malicious process may perform one or more suspicious events. In another example, a non-malicious process may perform a suspicious event as a result of being compromised by malware. In contrast, the term "non-suspicious event," as used herein, generally refers to any type or form of event performed by an uncompromised, non-malicious, and/or normally functioning process (e.g., a process unaffected by malware or errors).

The systems described herein may filter log files identified on an endpoint computing device in a variety of ways. In some examples, filter module 106 may filter log files 208 to identify which of log files 208 recorded non-suspicious events 212 and which of log files 208 recorded suspicious events 214. Filter module 106 may then determine which log files are to be sent to security server 206 by including log files that recorded suspicious events 214 within the group of log files to be sent to security server 206 and excluding log files that recorded non-suspicious events 212.

In some examples, filter module 106 may filter log files 208 based on the reputation of the processes that performed the events recorded by log files 208. A "reputation" of a process, as used herein, generally refers to any measurement or indication of the security or trustworthiness of the process. In some examples, a reputation of a process may be based on historical data describing malicious or non-malicious behaviors exhibited by the process.

In some embodiments, filter module 106 may use the reputation of a process to determine whether the process is trusted or untrusted. The term "untrusted process," as used herein, generally refers to any type or form of process that may be or is known to be associated with security threats (e.g., malware) or performance deficiencies. Notably, an untrusted process may not necessarily represent a malicious process, but may represent a process whose reputation is questionable or unknown. In contrast, the term "trusted process," as used herein, generally refers to any type or form of process that is known to be safe, secure, or otherwise uncompromised by security threats or performance deficiencies.

In some embodiments, filter module 106 may determine the trustworthiness of processes 210 by querying a database that stores the reputations of files that generate processes 210 (and any additional processes) when executed. For example, the database may reside within or be in communication with security server 206. Specifically, the systems and methods described herein may maintain and update a database that stores file reputations in conjunction with maintaining and updating security server 206. Additionally or alternatively, filter module 106 may identify the reputations of files that generated processes 210 by querying a database maintained within computing device 202, searching the web for file reputation information, and/or in any suitable manner.

Once filter module 106 identifies the reputation of a file that generated a process, filter module 106 may use the identified reputation to determine whether the process is trusted or untrusted. For example, filter module 106 may identify trusted processes by identifying processes generated by files with reputations such as "good" or "clean." In addition, filter module 106 may identify untrusted processes by identifying processes generated by files with reputations such as "malicious," "suspicious," or "unknown."

In some examples, filter module 106 may filter log files 208 based solely on whether the processes that performed the events recorded by log files 208 are trusted or untrusted. For example, filter module 106 may identify non-suspicious events 212 by identifying events performed by trusted processes. Similarly, filter module 106 may identify suspicious events 214 by identifying events performed by untrusted processes.

In other examples, filter module 106 may perform one or more additional analyses on the events recorded by log files 208 to identify non-suspicious events 212 and suspicious events 214. For example, filter module 106 may determine that an event performed by a trusted process may not necessarily represent a non-suspicious event. Specifically, filter module 106 may determine that a non-process threat may have compromised a trusted process, resulting in undesirable or harmful behaviors. The term "non-process threat," as used herein, generally refers to any file or portion of executable code (e.g., malware) that hijacks, corrupts, or compromises non-malicious processes.

In some embodiments, filter module 106 may determine whether a trusted process may have been compromised by a non-process threat by performing a behavioral analysis on the trusted process. For example, filter module 106 may search or monitor the activity of trusted processes within computing device 202 to identify any indication of abnormal behavior, such as accessing unusual files or registries and/or interacting with unexpected applications.

In some examples, filter module 106 may calculate trustworthiness scores for one or more processes based on behavioral analyses of the processes. For example, filter module 106 may calculate a trustworthiness score for a process based on the number and/or severity of abnormal, harmful, or otherwise suspicious behaviors exhibited by the process. In some examples, a trustworthiness score may be inversely proportional to the number and severity of suspicious behaviors. For example, a high trustworthiness score for a process may indicate a lower probability that the process has been compromised. Similarly, a low trustworthiness score for a process may indicate a higher probability that the process has been compromised.

In some embodiments, filter module 106 may determine that one or more trusted processes (e.g., processes with good reputations) fail to satisfy a predetermined trustworthiness score. For example, filter module 106 may assign each trusted process a trustworthiness score within a predetermined range (e.g., 0-10). Filter module 106 may then determine that any process with a trustworthiness score below a certain score (e.g., 5) fails to meet the trustworthiness threshold. In this example, filter module 106 may identify one or more of suspicious events 214 by identifying each event performed by a process with a trustworthiness score that fails to meet the trustworthiness threshold.

As explained above, filter module 106 may identify suspicious events 214 by identifying events performed by untrusted processes and/or by identifying events performed by processes with trustworthiness scores that fail to meet a predetermined trustworthiness threshold. Accordingly, filter module 106 may identify non-suspicious events 212 by identifying events performed by trusted processes and/or by identifying events performed by processes that satisfy a predetermined trustworthiness threshold. Notably, filter module 106 may classify each event recorded by log files 208 as either one of non-suspicious events 212 or one of suspicious events 214.

After identifying non-suspicious events 212 and suspicious events 214, filter module 106 may identify filtered log files 216 (e.g., log files to be forwarded to security server 206). For example, filter module 106 may identify filtered log files 216 by excluding or removing non-suspicious events 212 from log files 208. Notably, all or a portion of log files 208 may include multiple events. In cases where a log file includes both suspicious and non-suspicious events, filter module 106 may filter the log file by removing any non-suspicious events from the log file. As such, filter module 106 may ensure that security server 206 receives only suspicious events.

Returning to FIG. 3, at step 306 one or more of the systems described herein may forward the filtered log files from the endpoint computing device to the security server for analysis. For example, forward module 108 may, as part of computing device 202 in FIG. 2, forward filtered log files 216 from computing device 202 to security server 206 for analysis.

The systems described herein may forward filtered log files from an endpoint computing device to a security server in a variety of ways. As explained above, identification module 104 may identify log files 208 individually or in batches. Similarly, forward module 108 may forward filtered log files 216 to security server 206 individually or in batches. For example, forward module 108 may forward filtered log files 216 in real time as filter module 106 identifies suspicious events 214. Alternatively, forward module 108 may forward batches of filtered log files 216 at predetermined intervals or in predetermined quantities.

Figure 5:
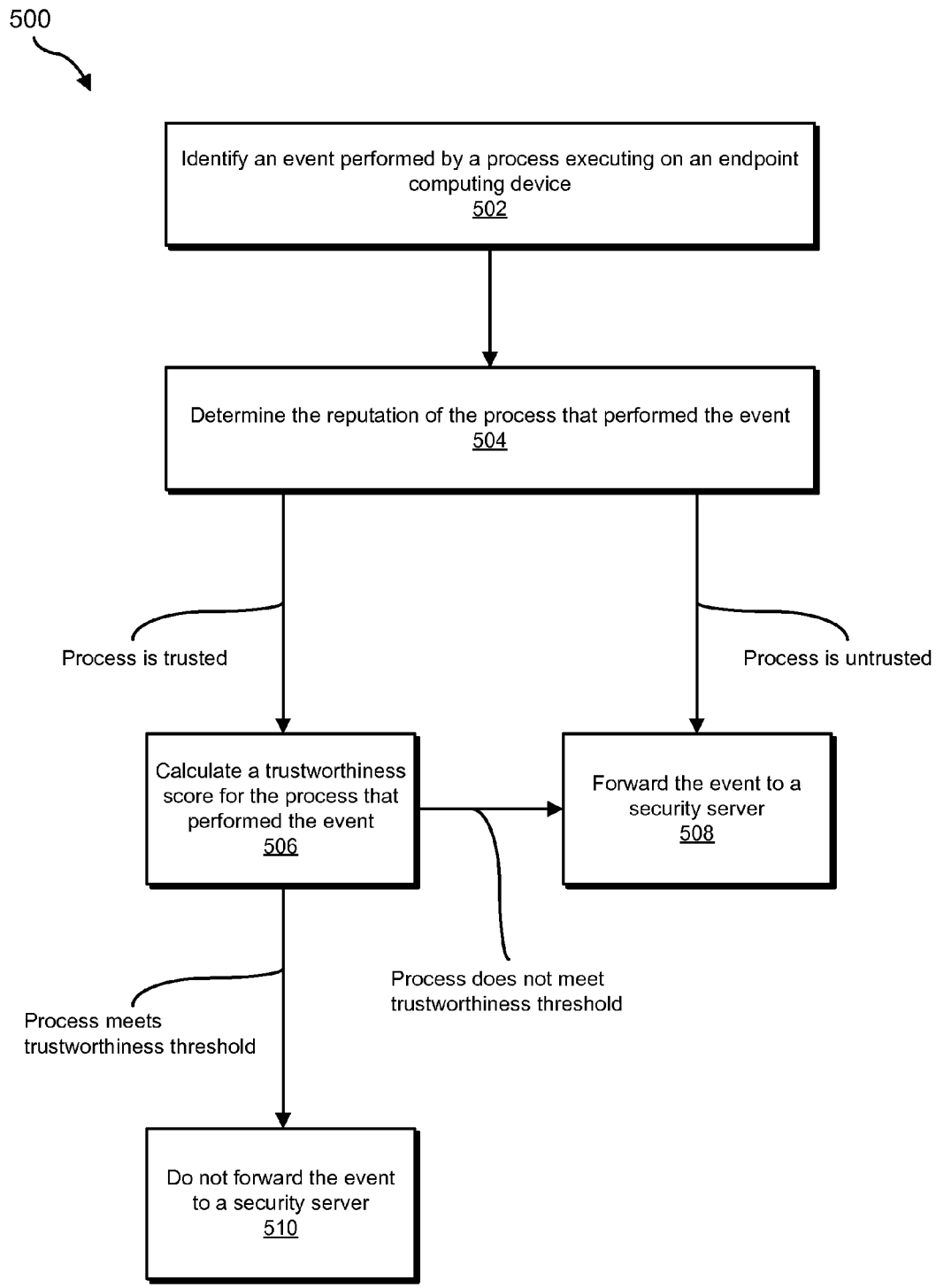
FIG. 5 is a flow diagram of an additional exemplary method for filtering log files.

FIG. 5 illustrates a flow chart of an exemplary method 500 for analyzing log files 208. As shown in FIG. 5, method 500 may include steps 502-510. At step 502, identification module 104 may identify an event performed by a process executing on an endpoint computing device. Next, at step 504, filter module 106 may determine the reputation of the process that performed the event. If the process is untrusted, method 500 may proceed to step 508. At step 508, forward module 108 may forward the event to a security server. However, if the process is trusted, method 500 may proceed to step 506. At step 506, filter module 106 may calculate a trustworthiness score for the process that performed the event. If the process does not meet a trustworthiness threshold, method 500 may proceed to step 508. If the process meets the trustworthiness threshold, method 500 may proceed to step 510. At step 510, filter module 106 may not forward the event to the security server.

The following will provide a detailed description of how the disclosed systems and methods may analyze log files 208(1)-(3) shown within FIG. 4 according to method 500. In one example, at step 502, identification module 104 may identify log file 208(1) at computing device 202. In this example, identification module 104 may identify the process "csrss.exe" within log file 208(1). Next, at step 504, filter module 106 may determine a reputation of the "crss.exe" process (e.g., by querying a remote database and/or security server 206). In this example, filter module 106 may determine that the reputation of the "csrss.exe" process is "not suspicious." As such, filter module 106 may determine that the "csrss.exe" process is trusted.

Because the "csrss.exe" process is trusted, method 500 may proceed to step 506. At step 506, filter module 106 may calculate a trustworthiness score for the "csrss.exe" process. In this example, filter module 106 may determine that the "csrss.exe" process meets the trustworthiness threshold. Specifically, filter module 106 may determine that the event "csrss.exe acted on ccSvcHst.exe block thread create" is a normal, non-malicious event. Because the "csrss.exe" process meets the trustworthiness threshold, method 500 may proceed to step 510. At step 510, filter module 106 may not forward the event performed by the "csrss.exe" process to security server 206. For example, filter module 106 may exclude log file 208(1) from filtered log files 216 that are to be forwarded to security server 206.

In another example, at step 502, identification module 104 may identify log file 208(2) at computing device 202. In this example, identification module 104 may identify the process "csrss.exe" within log file 208(2). Next, at step 504, filter module 106 may determine a reputation of the "csrss.exe" process. As in the above example, filter module 106 may determine that the reputation of the "csrss.exe" process is "not suspicious" and therefore that the "csrss.exe" process is trusted. As such, method 500 may proceed to step 506. At step 506, filter module 106 may calculate a trustworthiness score for the "csrss.exe" process. In this example, filter module 106 may determine that the "csrss.exe" process exhibits one or more suspicious behaviors on computing device 202. For example, filter module 106 may determine that the event "csrss.exe acted on Chrome.exe thread create" is a suspicious event because the process "csrss.exe" should not normally act on "Chrome.exe." As such, filter module 106 may determine that the "csrss.exe" process does not meet the trustworthiness threshold. Because the "csrss.exe" process does not meet the trustworthiness threshold, method 500 may proceed to step 508. At step 508, forward module 108 may forward log file 208(2) to security server 206 for analysis.

In a further example, at step 502, identification module 104 may identify log file 208(3) at computing device 202. In this example, identification module 104 may identify the process "cfmon.exe" within log file 208(3). Next, at step 504, filter module 106 may determine a reputation of the "cfmon.exe" process. In this example, filter module 106 may determine that the reputation of the "cfmon.exe" process is "suspicious." Specifically, filter module 106 may determine that security server 206 indicates that the "cfmon.exe" process is known to be malware. As such, filter module 106 may determine that the "cfmon.exe" process is untrusted. Because the "cfmon.exe" process is untrusted, method 500 may proceed directly to step 508. At step 508, forward module 108 may forward log file 208(3) to security server 206 for analysis.

Once filtered log files 216 are received at security server 206, the systems described herein may analyze filtered log files 216 for security threats, access control violations, and/or performance malfunctions. Security server 206 may analyze filtered log files 216 in any suitable manner, such as by comparing filtered log files 216 to malware signatures and/or performing heuristic analyses on filtered log files 216. In some examples, security server 206 may determine that one or more of filtered log files 216 indicates a security threat potentially affecting computing device 202. For example, security server 206 may determine that at least one of filtered log files 216 recorded an event that indicates one of processes 210 is malicious and/or one or processes 210 may have been compromised by malware.

After identifying the security threat based on the analysis of filtered log files 216, security server 206 may notify computing device 202 about the security threat. For example, security server 206 may transmit a notification to computing device 202 that identifies a malicious file and/or a comprised process on computing device 202. In addition, security server 206 may recommend an appropriate security action to perform on the identified security threat. For example, security server 206 may recommend that computing device 202 perform a malware scan and/or quarantine an affected process. In some examples, security module 110, on computing device 202, may receive the identification of the security threat and/or the recommended security action. Security module 110 may then perform the recommended security action and/or any additional security action to mitigate the security threat.

In some examples, security server 206 may receive filtered log files from one or more additional computing devices. For example, modules 102 may be configured as a security application installed on multiple computing devices (e.g., computing devices within an organization or enterprise). The security application on each computing device may identify and filter log files on the computing devices and then send the filtered log files to one or more central servers, such as security server 206. After receiving the filtered log files, the central server may analyze the filtered log files to identify potential security threats on multiple computing devices.

In some examples, security server 206 may more efficiently and/or effectively identify security threats by analyzing filtered log files generated by multiple computing devices. For example, security server 206 may identify trends and/or patterns within the filtered log files. Additionally or alternatively, security server 206 may compare incoming log files from one computing device with log files known to indicate certain types of malware generated on other computing devices.

The systems and methods described herein may be implemented in a variety of ways and provide a number of advantages. As explained above, by identifying and analyzing log files on endpoint computing devices, the systems and methods described herein may filter the log files before forwarding the log files from the endpoint computing devices to a security server for analysis. For example, by analyzing the reputation and/or behaviors of processes that performed events recorded by log files, the disclosed systems and methods may identify log files that recorded suspicious events and log files that recorded non-suspicious events. The systems and methods described herein may then forward only log files that recorded suspicious events (instead of log files that recorded non-suspicious events) to a security server that identifies security threats based on the filtered log files. As such, the disclosed systems and methods may reduce the time, bandwidth, and/or computing resources consumed by a security server that analyzes log files by preventing irrelevant and/or unnecessary log files from being sent to the security server.

Figure 6:
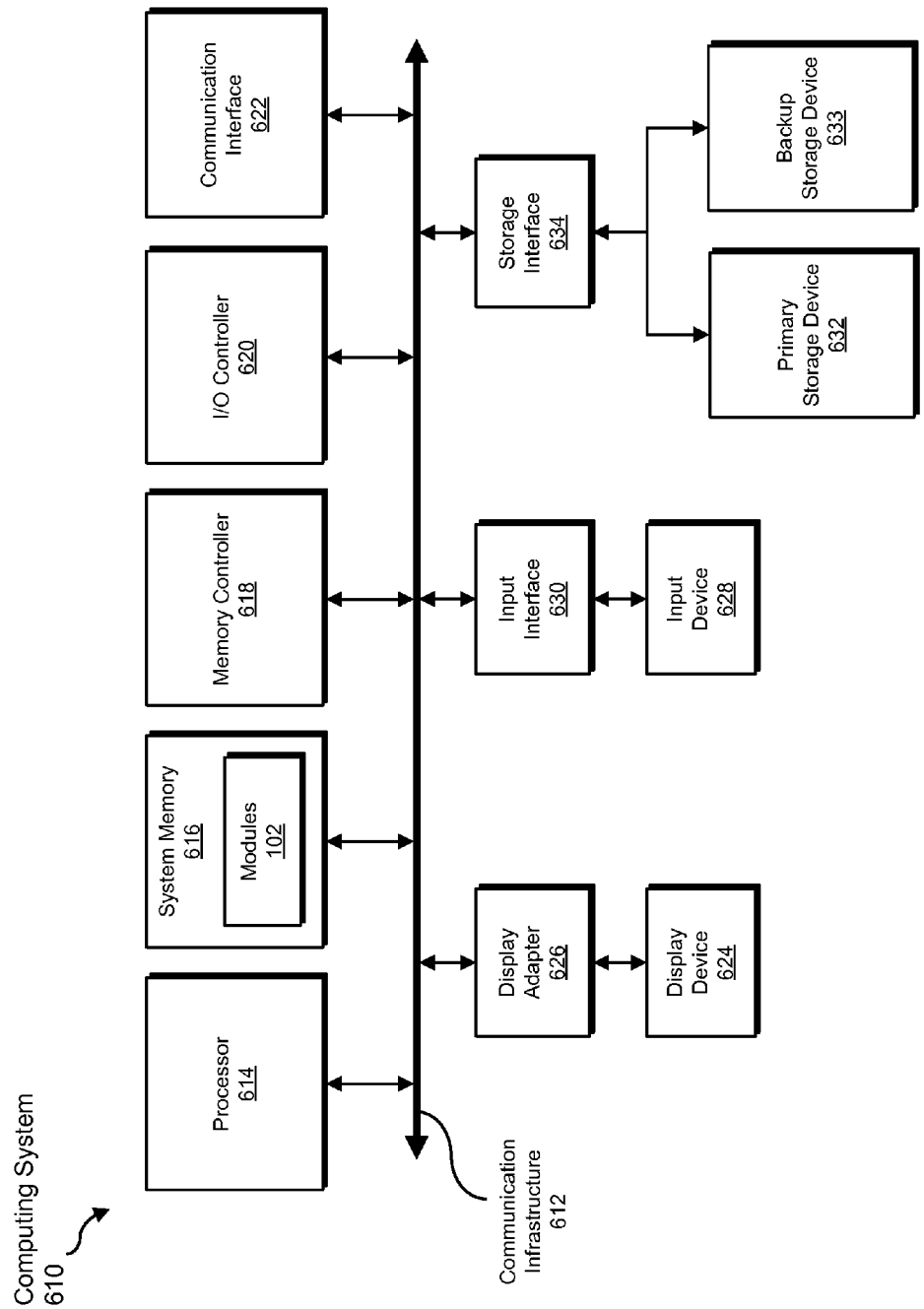
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiment is computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633.

When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
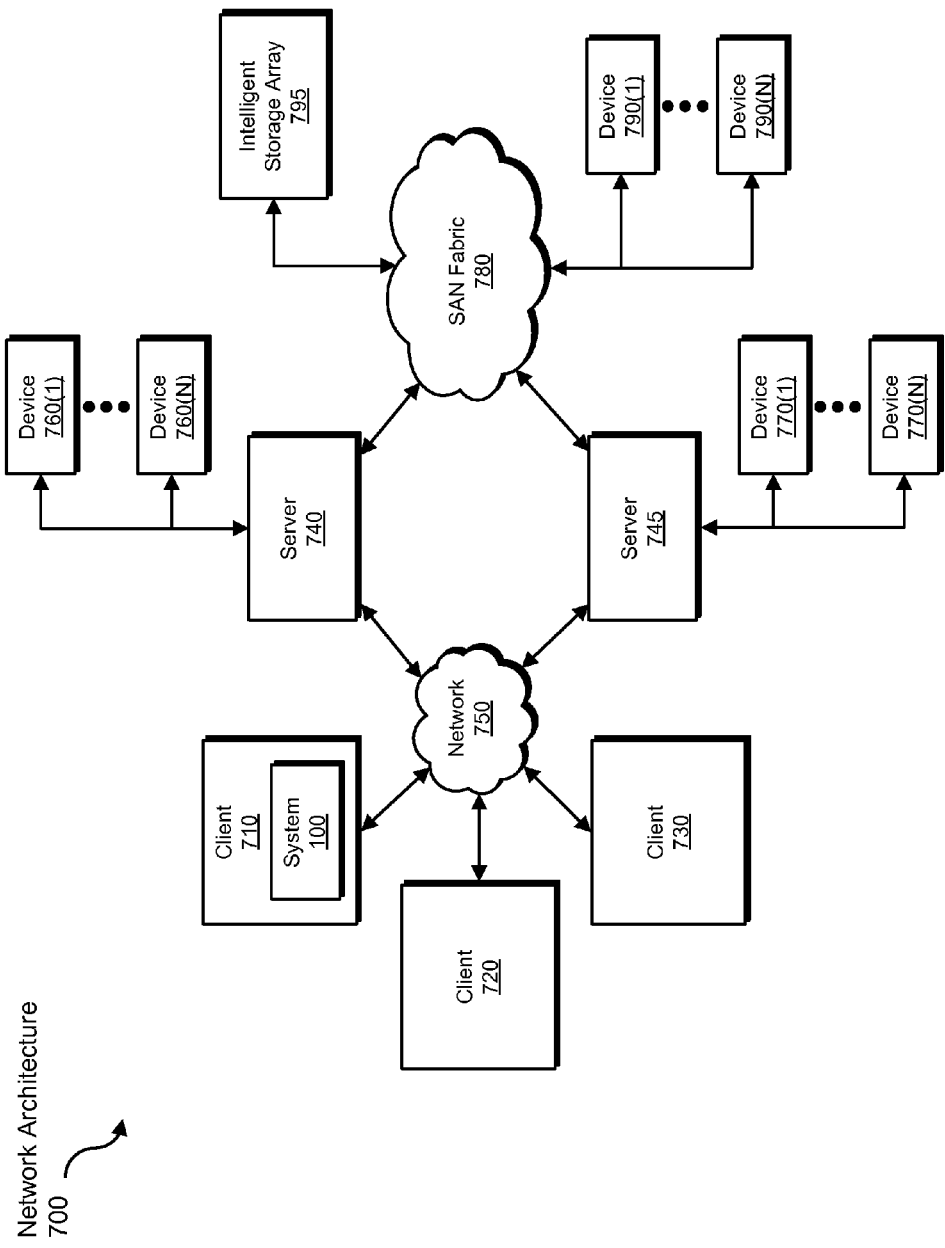
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for filtering log files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive log files to be transformed, transform the log files, output a result of the transformation to a security server, use the result of the transformation to detect security threats on endpoint computing devices, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for filtering log files, at least a portion of the method being performed by an endpoint computing device comprising at least one processor, the method comprising:
   identifying, on the endpoint computing device, a plurality of log files that recorded events performed by processes executing on the endpoint computing device;
   prior to sending the log files from the endpoint computing device to a security server for analysis, filtering, at the endpoint computing device, based on an analysis of the events recorded by the log files, the log files by excluding log files that recorded non-suspicious events, the log files that recorded non-suspicious events comprising at least one of:
      log files that recorded events performed by trusted processes; and
      log files that recorded events performed by processes that satisfy a predetermined trustworthiness threshold;
   reducing computing resources used by the security server to identify security threats on the endpoint computing device by forwarding, from the endpoint computing device to the security server, the filtered log files and not the excluded log files;
   receiving, from the security server, an identification of at least one security threat potentially affecting the endpoint computing device that was identified by the security server by analyzing the filtered log files; and
   performing, at the endpoint computing device, a malware scan that mitigates the security threat.

2. The method of claim 1, wherein filtering the log files comprises including, within the filtered log files that are to be forwarded to the security server, log files that recorded at least one of:
   events performed by untrusted processes; and
   events performed by trusted processes that nevertheless fail to satisfy the predetermined trustworthiness threshold.

3. The method of claim 2, wherein including the log files that recorded events performed by untrusted processes comprises determining, by querying a database that stores reputations of files that generate processes, that the recorded events in question were performed by untrusted processes.

4. The method of claim 2, wherein including the log files that recorded events performed by trusted processes that nevertheless fail to satisfy the predetermined trustworthiness threshold comprises:
   calculating, based on a behavioral analysis of the trusted processes, trustworthiness scores for the trusted processes; and
   determining that the trustworthiness scores for the trusted processes fail to satisfy the predetermined trustworthiness threshold.

5. The method of claim 4, further comprising determining that the trusted processes were potentially compromised by non-process threats.

6. The method of claim 1, wherein excluding the log files that recorded events performed by trusted processes comprises determining, by querying a database that stores reputations of files that generate processes, that the recorded events in question were performed by trusted processes.

7. The method of claim 1, wherein excluding the log files that recorded events performed by processes that satisfy the predetermined trustworthiness threshold comprises:
   calculating, based on a behavioral analysis of the processes, trustworthiness scores for the processes; and
   determining that the trustworthiness scores for the processes satisfy the predetermined trustworthiness threshold.

8. A system for filtering log files, the system comprising:
   an identification module, stored in memory, that identifies, on at least one endpoint computing device, a plurality of log files that recorded events performed by processes executing on the endpoint computing device;
   a filter module, stored in memory, that prior to the log files being sent from the endpoint computing device to a security server for analysis, filters, at the endpoint computing device, based on an analysis of the events recorded by the log files, the log files by excluding log files that recorded non-suspicious events, the log files that recorded non-suspicious events comprising at least one of:
      log files that recorded events performed by trusted processes; and
      log files that recorded events performed by processes that satisfy a predetermined trustworthiness threshold;
   a forward module, stored in memory, that reduces computing resources used by the security server to identify security threats on the endpoint computing device by forwarding, from the endpoint computing device to the security server, the filtered log files and not the excluded log files;
   a security module, stored in memory, that:
      receives, from the security server, an identification of at least one security threat potentially affecting the endpoint computing device that was identified by the security server by analyzing the filtered log files; and
      performs, at the endpoint device, a malware scan that mitigates the security threat; and
   at least one physical processor configured to execute the identification module, the filter module, and the forward module.

9. The system of claim 8, wherein the filter modules filters the log files by including, within the filtered log files that are to be forwarded to the security server, log files that recorded at least one of:
   events performed by untrusted processes; and
   events performed by trusted processes that nevertheless fail to satisfy the predetermined trustworthiness threshold.

10. The system of claim 9, wherein the filter module includes the log files that recorded events performed by untrusted processes by determining, by querying a database that stores reputations of files that generate processes, that the recorded events in question were performed by untrusted processes.

11. The system of claim 9, wherein the filter module includes the log files that recorded events performed by trusted processes that nevertheless fail to satisfy the predetermined trustworthiness threshold by:
   calculating, based on a behavioral analysis of the trusted processes, trustworthiness scores for the trusted processes; and
   determining that the trustworthiness scores for the trusted processes fail to satisfy the predetermined trustworthiness threshold.

12. The system of claim 11, wherein the filter module further determines that the trusted processes were potentially compromised by non-process threats.

13. The system of claim 8, wherein the filter module excludes the log files that recorded events performed by trusted processes by determining, by querying a database that stores reputations of files that generate processes, that the recorded events in question were performed by trusted processes.

14. The system of claim 8, wherein the filter module excludes the log files that recorded events performed by processes that satisfy the predetermined trustworthiness threshold by:
   calculating, based on a behavioral analysis of the processes, trustworthiness scores for the processes; and
   determining that the trustworthiness scores for the processes satisfy the predetermined trustworthiness threshold.

15. A non-transitory computer-readable medium comprising one or more computer-executable instructions that, when executed by at least one processor of at least one endpoint computing device, cause the endpoint computing device to:
   identify, on the endpoint computing device, a plurality of log files that recorded events performed by processes executing on the endpoint computing device;
   prior to sending the log files from the endpoint computing device to a security server for analysis, filter, at the endpoint computing device, based on an analysis of the events recorded by the log files, the log files by excluding log files that recorded non-suspicious events, the log files that recorded non-suspicious events comprising at least one of:
      log files that recorded events performed by trusted processes; and
      log files that recorded events performed by processes that satisfy a predetermined trustworthiness threshold;
   reduce computing resources used by the security server to identify security threats on the endpoint computing device by forwarding, from the endpoint computing device to the security server, the filtered log files and not the excluded log files;
   receive, from the security server, an identification of at least one security threat potentially affecting the endpoint computing device that was identified by the security server by analyzing the filtered log files; and
   perform, at the endpoint computing device, a malware scan that mitigates the security threat.

16. The non-transitory computer-readable medium of claim 15, wherein the one or more computer-executable instructions cause the endpoint computing device to filter the log files by including, within the filtered log files that are to be forwarded to the security server, log files that recorded at least one of:
   events performed by untrusted processes; and
   events performed by trusted processes that nevertheless fail to satisfy the predetermined trustworthiness threshold.

* * * * *